United States Patent Office 3,084,160
Patented Apr. 2, 1963

3,084,160
CARBAMOYLPIPERAZINYLALKYL-
PHENTHIAZINE DERIVATIVES
Robert Michel Jacob, Ablon-sur-Seine, and Raymond
Jacques Horclois, Malakoff, France, assignors to Societe des Usines Chimiques Rhone-Poulenc, Paris,
France, a French body corporate
No Drawing. Filed Apr. 29, 1960, Ser. No. 25,550
Claims priority, application France Jan. 8, 1958
5 Claims. (Cl. 260—243)

This invention relates to new phenthiazine derivatives, to processes for their preparation, and pharmaceutical compositions containing them.

This application is a continuation-in-part of application Serial No. 783,192, filed December 29, 1958, now abandoned.

It is well known that various N-substituted phenthiazine derivatives possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. Nevertheless, of the very large number of possible N-substituted phenthiazine compounds that have heretofore been proposed or tested by various workers, only comparatively few types have been proven to have useful application in human or veterinary medicine. Both the nature and the degree of useful effect can radically alter even with apparently small changes in chemical structure.

It is an object of the present invention to provide new phenthiazine derivatives which possess useful pharmacological properties of a nature hereinafter referred to in detail and of a degree of activity that could not have been predicted from knowledge of their chemical structure.

The phenthiazine derivatives of the present invention are those which conform to the general formula:

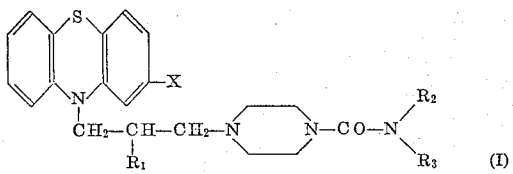

and their acid addition and quaternary ammonium salts, wherein X represents a cyano (—CN), methylthio (—SCH$_3$), methanesulphonyl (—SO$_2$CH$_3$) or dimethylsulphamoyl (—SO$_2$N(CH$_3$)$_2$) group, R$_1$ represents a hydrogen atom or a methyl group and R$_2$ and R$_3$ are the same or different and each represents a hydrogen atom or a methyl group.

The new phenthiazine derivatives of Formula I possess pharmacodynamic properties; in particular they have a very effective sedative action. Their toxicity is low and they give rise to practically no undesirable secondary effects; in particular they are devoid of cataleptic activity. Some of the compounds for example 3-dimethylsulphamoyl - 10-(3-4'-carbamoyl-1'-piperazinylpropyl)phenthiazine and 3-dimethylsulphamoyl-10(3-4'-carbamoyl-1'-piperazinyl-2-methylpropyl)phenthiazine are also antiemetics and give no undesirable secondary effects, such as a hypnotic action.

Compounds of outstanding importance as sedatives are 3 - cyano-10-(3-4'-carbamoyl-1'-piperazinylpropyl)phenthiazine, 3-methylthio-10-(3-4'-carbamoyl-1'-piperazinylpropyl)phenthiazine, and 3-methanesulphonyl-10-(3-4'-carbamoyl-1'-piperazinylpropyl)phenthiazine.

The new phenthiazine compounds of general formula I may be prepared by the application of known methods for the conversion of phenthiazine and its C-substituted products into the corresponding 10-aminoalkyl phenthiazines. Such methods when so applied can be defined generically as comprising the interaction of a phenthiazine derivative of the formula:

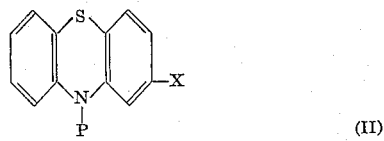

(wherein X is as hereinbefore defined) with a compound Q, the group P and the compound Q being such that they will interact to produce or form in the 10-position of the phenthiazine nucleus an aminoalkyl residue of the formula:

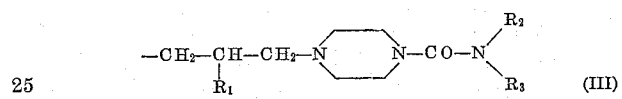

wherein R$_1$, R$_2$ and R$_3$ are as hereinbefore defined.

According to a feature of the present invention, the phenthiazine derivatives of Formula I are prepared by a process which comprises reacting a piperazine derivative of the general formula:

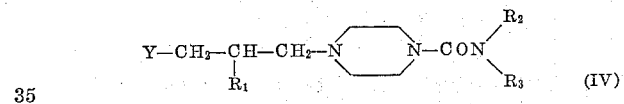

(Wherein Y represents the acid residue of a reactive ester such as a halogen atom or a sulphuric or sulphonic ester residue and the other symbols are as hereinbefore defined) or an acid addition salt thereof, with a phenthiazine of the general formula:

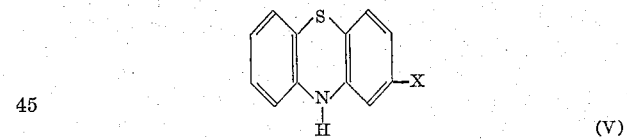

wherein X is as hereinbefore defined.

The reaction may be effected with or without a solvent in the presence or absence of a condensing agent. It is advantageous to use a solvent of the group of aromatic hydrocarbons (for example, toluene or xylene) in the presence of a condensing agent, preferably of the class of alkali metals and their derivatives (such as, for example, hydrides, amides, hydroxides, alcoholates, metal alkyls or aryls) and, more particularly, metallic sodium, sodamide, powdered sodium or potassium hydroxide, lithium hydride, sodium tert-butoxide, butyllithium and phenyllithium. The reaction is preferably carried out at the boiling temperature of the solvent. It is advantageous to use the reactive ester of Formula IV in the form of the free base in solution in, for example, benzene, toluene or xylene, and to add it to the mixture of the other reactants wherein the phenthiazine employed may already be present, in part at least, in the form of an alkali metal salt. The reaction may also be effected with a salt of the reactive ester but in this case a greater proportion of the condensing agent must be used in order to neutralise the acid of the salt employed.

According to a further feature of the present invention, the new phenthiazine derivatives of Formula I are prepared by the process which comprises reacting a phenthiazine of the general formula:

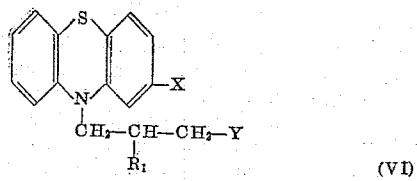

(wherein X, $R_1$ and Y are as hereinbefore defined) with a piperazine of the general formula:

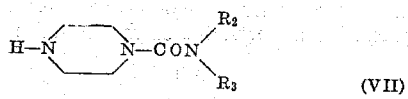

(wherein $R_2$ and $R_3$ are as hereinbefore defined). The reaction is preferably carried out in an inert organic medium, for example, in a solvent such as an alcohol.

According to another feature of the invention, phenthiazine derivatives conforming to Formula I are prepared by reacting a piperazinylalkylphenthiazine of the general formula:

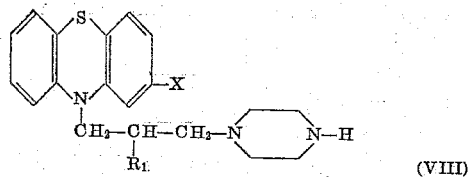

(wherein X and $R_1$ are as hereinbefore defined) with a carbamoyl halide of the formula:

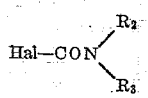

(wherein Hal represents a halogen atom, preferably chlorine, and $R_2$ and $R_3$ are as hereinbefore defined), isocyanic acid or an alkali metal salt thereof, methyl isocyanate or urea. Reaction with isocyanic acid, or an alkali metal salt thereof, or urea gives a product conforming to Formula I in which $R_2$ and $R_3$ are hydrogen atoms; reaction with methyl isocyanate gives a product in which one of $R_2$ and $R_3$ is a hydrogen atom and the other is a methyl group.

The reaction with carbamoyl halide may be effected by heating the reagents in an aromatic hydrocarbon solvent such as benzene or toluene optionally in the presence of a tertiary base such as pyridine, preferably at the boiling temperature of the solvent. The reaction with alkali metal isocyanate may be effected at room temperature in aqueous solution with an acid addition salt (e.g. hydrochloride) of the piperazinylalkylphenthiazine. The reaction with methyl isocyanate may be effected at a temperature below 40° C. with the reagents in solution in an aromatic hydrocarbon solvent. The reaction with urea may be effected by heating the reagents under a current of nitrogen at a temperature between 120° and 180° C.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. However, they may also be employed in the form of non-toxic quaternary ammonium salts obtained by reaction with organic halides (e.g. methyl or ethyl iodide, chloride or bromide or allyl or benzyl chloride or bromide) or other reactive esters, e.g. toluene-p-sulphonates.

The present invention includes within its scope pharmaceutical compositions comprising one or more of the compounds of Formula I, or an acid addition or quaternary ammonium salt thereof, and a significant amount of a pharmaceutical carrier which may be either a solid material or a liquid. In clinical practice the compounds of the present invention will normally be administered orally, in consequence of which the preferred formulations are those of the kind suitable for oral administration.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should be administered so as to give, in the case of oral administration, 20 to 300 mg. of active substance per day and, in the case of parenteral administration, 10 to 150 mg. of such substance per day.

The following examples illustrate the invention:

*Example I*

3-cyano-10-(3-1'-piperazinylpropyl)phenthiazine (61.5 g.) is dissolved in N hydrochloric acid (350 cc.). A solution of potassium cyanate (16 g.) dissolved in water (30 cc.) is added. After standing overnight a crystalline product is obtained which is powdered and shaken with sodium hydroxide ($d$=1.33; 40 cc.) and chloroform (200 cc.). After washing with water and drying over potassium carbonate, the solvent is removed in vacuo. The resin is treated with ethyl acetate (250 cc.) and recrystallised from ethanol (250 cc.) to give 3-cyano-10-(3-4'-carbamoyl - 1' - piperazinylpropyl)phenthiazine (54 g.), M.P. 142–144° C.

*Example II*

Proceeding as in Example I but starting with 3-cyano-10-(3-1'-piperazinyl-2-methylpropyl)phenthiazine (7.3 g.) and potassium cyanate (1.8 g.), there is obtained after recrystallisation from ethanol and drying at 100° C. in vacuo 3-cyano - 10 - (3,4'-carbamoyl - 1' - piperazinyl-2-methylpropyl)phenthiazine (5.2 g.), M.P. 168–170° C.

*Example III*

Methyl isocyanate (1.5 g.) is added over 10 minutes to a solution of 3-cyano-10-(3-1'-piperazinylpropyl)phenthiazine (8.8 g.) in toluene (50 cc.). The mixture is allowed to stand overnight and then shaken with N methanesulphonic acid (30 cc.). The mixture is decanted, basified with sodium hydroxide and extracted with chloroform. After concentration in vacuo, the product is purified by chromatography on an alumina column and recrystallised from ethyl acetate (150 cc.). 3-cyano-10-(3,4'- methylcarbamoyl-1'-piperazinylpropyl)phenthiazine (7.7 g.), M.P. 155° C., is obtained.

Example IV

To a solution of 3-cyano-10-(3-1'-piperazinylpropyl) phenthiazine (8.8 g.) in toluene (50 cc.) is added anhydrous pyridine (2.5 g.) followed by dimethylcarbamoyl chloride (4 g.). The mixture is heated on a water-bath for 4 hours and then treated with dilute sodium hydroxide and water, dried over potassium carbonate and concentrated in vacuo. On purification by chromatography on an alumina column a product (9.5 g.) is obtained. The hydrochloride of the product is prepared in a mixture of alcohol and ether and recrystallised from ethanol (50 cc.) to give 3-cyano-10-(3-4'-dimethylcarbamoyl-1'-piperazinylpropyl)phenthiazine hydrochloride (8.8 g.), M.P. 195–200° C.

Example V 3-dimethylsulphamoyl-10-(3-1'-piperazinylpropyl) phenthiazine (6.5 g.) is dissolved in N hydrochloric acid (30 cc.) and a solution of potassium cyanate (1.35 g.) in water (3 cc.) is added. After standing overnight, the mixture is treated with sodium bicarbonate and extracted with chloroform (8 x 25 cc.). After drying over sodium sulphate, the solvent is removed in vacuo. The product is recrystallised by dissolving it in chloroform (75 cc.) and adding ethanol (125 cc.) to give 3-dimethylsulphamoyl-10-(3-4'-carbamoyl-1'-piperazinylpropyl)phenthiazine (5 g.), M.P. 215° C.

Example VI 3-dimethylsulphamoyl-10-(3-1'-piperazinyl-2-methylpropyl)phenthiazine (8.9 g.) is dissolved in N hydrochloric acid (40 cc.) and a solution of potassium cyanate (1.8 g.) in water (5 cc.) is added. After standing overnight, the mixture is treated with sodium hydroxide ($d=1.33$; 10 cc.) and extracted with chloroform (2 x 50 cc.). After washing with water, drying over potassium carbonate, removing the solvent in vacuo, and recrystallisation from ethyl acetate (50 cc.) 3-dimethylsulphamoyl-10-(3-4'-carbamoyl-1'-piperazinyl-2-methylpropyl)phenthiazine (6.2 g.) is obtained, M.P. 154–156° C

Example VII 3-methylthio-10-(3-1'-piperazinylpropyl)phenthiazine (9.3 g.) is dissolved in N hydrochloric acid (100 cc.) and a solution of potassium cyanate (2.4 g.) in water (15 cc.) is added. After standing overnight, the mixture is treated with sodium hydroxide ($d=1.33$; 15 cc.) and extracted with chloroform (3 x 100 cc.). The chloroformic solution is washed with water, dried over sodium sulphate and concentrated in vacuo whereby 3-methylthio-10-(3-4'-carbamoyl-1'-piperazinylpropyl)phenthiazine (9.6 g.) is obtained which, after recrystallisation from ethyl acetate followed by 70% ethanol, melts at 148–150° C.

Example VIII

Proceeding as in Example VII but starting with 3-methanesulphonyl-10-(3-1'-piperazinylpropyl)phenthiazine (8.3 g.) and potassium cyanate (2 g.) 3-methanesulphonyl-10-(3-4'-carbamoyl-1'-piperazinylpropyl)phenthiazine (8 g.) is obtained which, after recrystallisation from ethyl acetate followed by 80% ethanol, melts at 186° C.

Example IX

Tablets of 150 mg. are prepared having the following composition:

| | Mg. |
|---|---|
| 3-cyano-10-(3-4'-carbamoyl-1'-piperazinylpropyl) phenthiazine | 25.8 |
| Starch | 91.2 |
| Dry powdered silica gel | 30.0 |
| Magnesium stearate | 3.0 |

These tablets can be employed at the rate of from 1 to 10 per day.

We claim:

1. A member of the class consisting of 3-cyano-10-(3-4'-carbamoyl-1'-piperazinylpropyl)phenthiazine, 3-methanesulphonyl-10-(3-4'-carbamoyl-1'-piperazinylpropyl)phenthiazine, 3-dimethylsulphamoyl-10-(3-4'-carbamoyl-1'-piperazinylpropyl)phenthiazine and 3-cyano-10-(3-4'-dimethylcarbamoyl-1'-piperazinylpropyl)phenthiazine and their therapeutically acceptable non-toxic acid addition salts.

2. 3-cyano-10-(3-4'-carbamoyl-1'-piperazinylphenyl)phenthiazine.

3. 3-methanesulphonyl-10-(3-4'-carbamoyl-1'-piperazinylpropyl)phenthiazine.

4. 3-dimethylsulphamoyl-10-(3-4'-carbamoyl-1'-piperazinylpropyl)phenthiazine.

5. 3-cyano-10-(3-4'-dimethylcarbamoyl-1'-piperazinylpropyl)phenthiazine.

References Cited in the file of this patent

UNITED STATES PATENTS

| 2,902,484 | Horclois | Sept. 1, 1959 |
| 2,902,485 | Horclois | Sept. 1, 1959 |
| 2,908,683 | Jacob et al. | Oct. 13, 1959 |
| 2,928,767 | Gulesich et al. | Mar. 15, 1960 |
| 2,944,054 | Gordon | July 5, 1960 |

FOREIGN PATENTS

| 293/55 | South Africa | Aug. 22, 1955 |
| 780,193 | Great Britain | July 31, 1957 |

OTHER REFERENCES

Conant: The Chemistry of Organic Compounds, page 264, 1939 revised ed., New York.

Lowy et al.: "An Introduction to Organic Chemistry," 6th edition, page 213 (1945).

Hromatka et al.: Monatsch. für Chemie, volume 88, pages 242 to 249 (April 15, 1957).

Abstract of Australian patent application 44,538/58, open to public inspection as of June 25, 1959 (one page).